United States Patent
Chee et al.

(10) Patent No.: US 11,663,348 B2
(45) Date of Patent: May 30, 2023

(54) DYNAMIC ENTITLEMENT FOR BLOCKCHAIN DATA

(71) Applicant: International Business Machines Corporation, Armonk, NY (US)

(72) Inventors: Yi-Min Chee, Yorktown Heights, NY (US); Justin Gregory Manweiler, Yorktown Heights, NY (US); Ashish Jagmohan, Irvington, NY (US); Krishna C. Ratakonda, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 16/230,426

(22) Filed: Dec. 21, 2018

(65) Prior Publication Data

US 2020/0202021 A1 Jun. 25, 2020

(51) Int. Cl.
G06F 21/62 (2013.01)
H04L 9/40 (2022.01)
H04L 9/06 (2006.01)
H04L 9/00 (2022.01)

(52) U.S. Cl.
CPC ........ *G06F 21/6209* (2013.01); *H04L 9/0637* (2013.01); *H04L 63/0414* (2013.01); *H04L 63/10* (2013.01); *G06F 2221/2141* (2013.01); *H04L 9/50* (2022.05)

(58) Field of Classification Search
CPC ... H04L 9/0637; H04L 63/10; H04L 2209/38; G06F 21/6209
See application file for complete search history.

(56) References Cited

U.S. PATENT DOCUMENTS

| 9,635,000 | B1 | 4/2017 | Muftic |
| 10,762,079 | B2 | 9/2020 | Shi et al. |
| 2015/0046363 | A1 | 2/2015 | McNamara et al. |
| 2015/0073929 | A1 | 3/2015 | Psota et al. |
| 2016/0292672 | A1 | 10/2016 | Fay et al. |
| 2016/0365978 | A1 | 12/2016 | Ganesan et al. |

(Continued)

FOREIGN PATENT DOCUMENTS

| WO | 2017194815 A1 | 11/2017 |
| WO | 2020024607 A1 | 2/2020 |

OTHER PUBLICATIONS

Feng, An information system for food safety monitoring in supply chains based on HACCP, Blockchain and internet things, Mar. 2018, ePubWU, the institutional repository of the WU Vienna University of Economics and Business, https://epub.cwu/ac.at/6090/> (Year: 2018).

(Continued)

*Primary Examiner* — Ellen Tran

(57) ABSTRACT

An example operation may include one or more of receiving a data file submitted by a node, the data file comprising information about an event-driven process for a chain of nodes, retrieving an entitlement mode of the data file from a data block that is stored among a hash-linked chain of data blocks on a distributed ledger, determining access rights of the data file with respect to another node in the chain of nodes based on the retrieved entitlement mode of the data file, and transmitting information about the event-driven process to the other node based on the determined access rights of the other node.

20 Claims, 14 Drawing Sheets

(56) References Cited

U.S. PATENT DOCUMENTS

| | | |
|---|---|---|
| 2017/0039500 A1 | 2/2017 | Leidner et al. |
| 2017/0116693 A1* | 4/2017 | Rae ................... H04L 9/3236 |
| 2017/0262862 A1 | 9/2017 | Aljawhari |
| 2018/0068091 A1* | 3/2018 | Gaidar ................. G06F 21/16 |
| 2018/0089256 A1* | 3/2018 | Wright, Sr. ........ G06Q 20/1235 |
| 2018/0167217 A1* | 6/2018 | Brady ................... H04L 67/10 |
| 2018/0285810 A1 | 10/2018 | Ramachandran et al. |
| 2018/0322259 A1* | 11/2018 | Solow ................. H04L 9/0819 |
| 2019/0139047 A1 | 5/2019 | Ronnow et al. |
| 2019/0228388 A1 | 7/2019 | Hu et al. |
| 2019/0228391 A1 | 7/2019 | Hu et al. |
| 2019/0306549 A1 | 10/2019 | Dietz et al. |
| 2019/0335715 A1 | 11/2019 | Hicks et al. |
| 2019/0358515 A1 | 11/2019 | Tran et al. |
| 2019/0370798 A1 | 12/2019 | Hu et al. |
| 2020/0005299 A1 | 1/2020 | Castinado et al. |
| 2020/0042615 A1 | 2/2020 | Boudville |
| 2020/0133921 A1 | 4/2020 | Lee et al. |
| 2020/0202014 A1 | 6/2020 | Xu et al. |
| 2020/0202021 A1 | 6/2020 | Chee et al. |
| 2020/0226546 A1 | 7/2020 | Deshpande et al. |
| 2020/0380508 A1 | 12/2020 | Sheriff |

OTHER PUBLICATIONS

List of IBM Patents or Patent Applications Treated as Related, todays date.

Yi-Mim CHEE et al., "Blockchain Trust Anchor", U.S. Appl. No. 16/230,212, filed Dec. 21, 2018 (a copy is not provided as this application is available to the Examiner).

Narayanaswami et al. Blockchain anchored supply chain automation, Feb. 2019, IBM J. Res. & Dev., vol. 63, No. 2/3, Paper 7, pp. 1-11 (Year: 2019).

Nakamoto, "Bitcoin: A Peer-to-Peer Electronic Cash System", 2008, available at https://www.modeapp.com/bitcoin-whitepaper (Year: 2008).

* cited by examiner

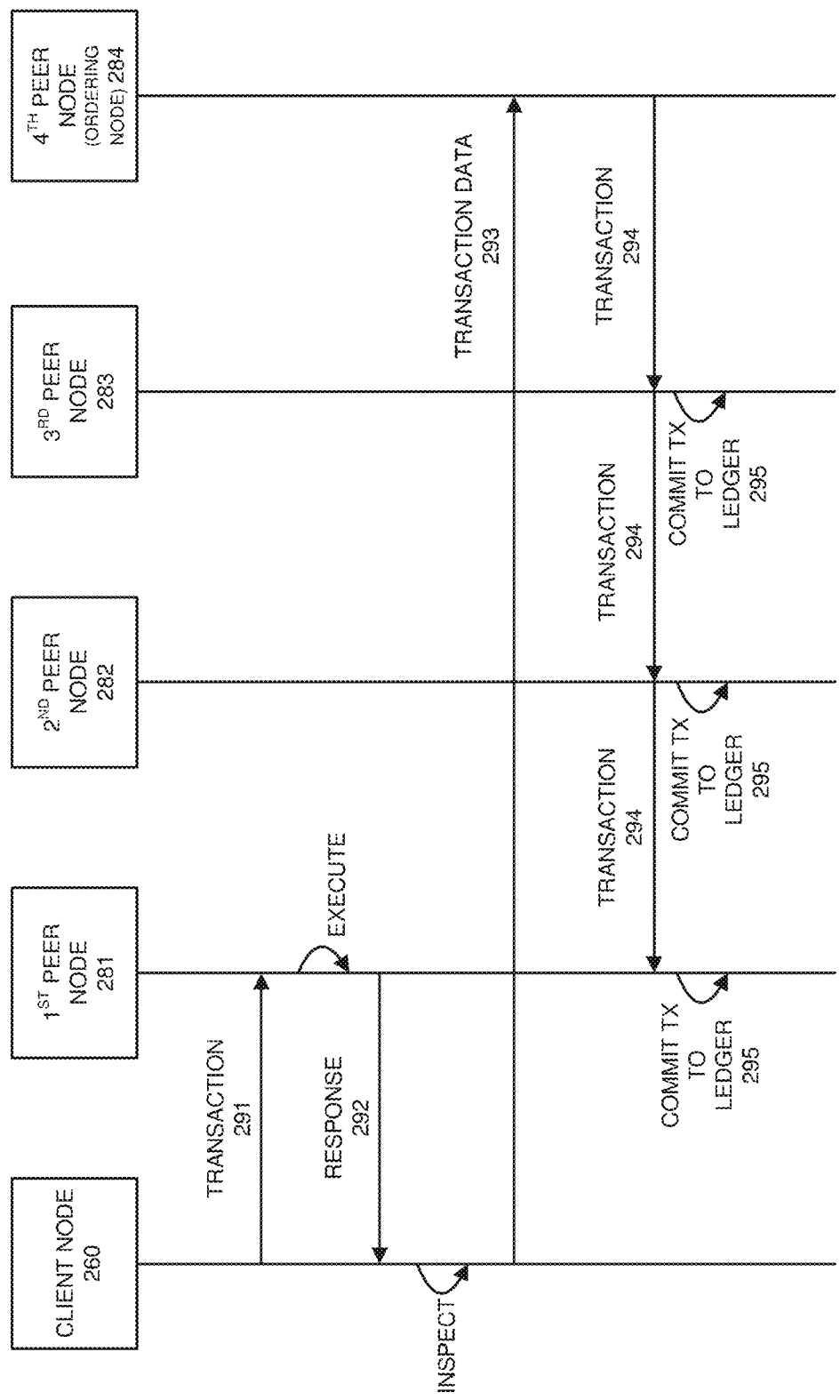

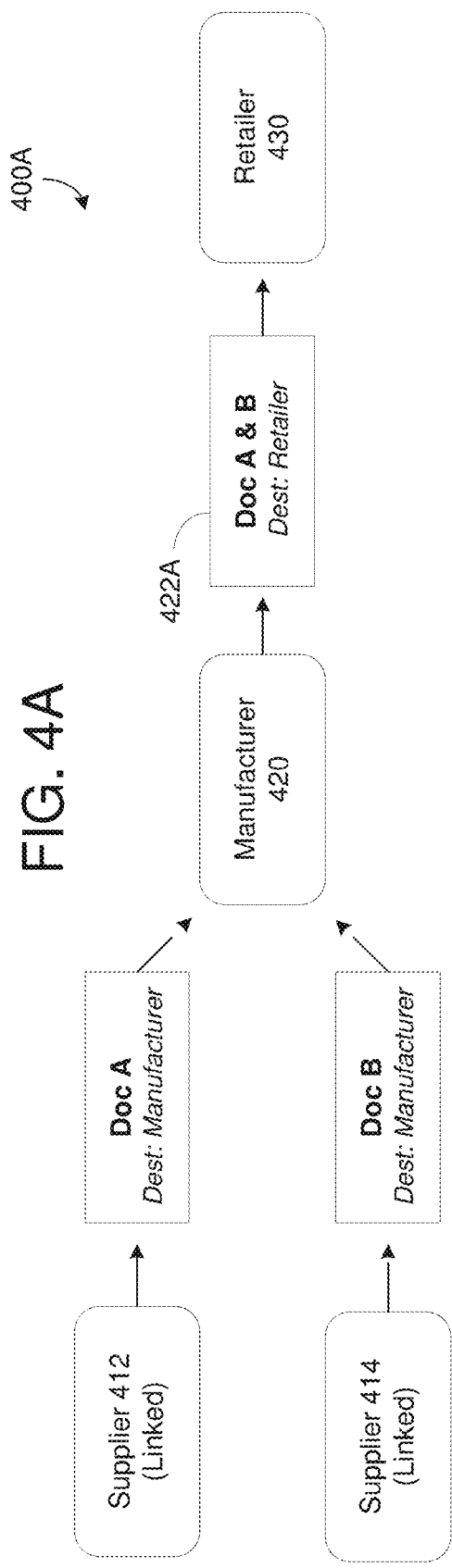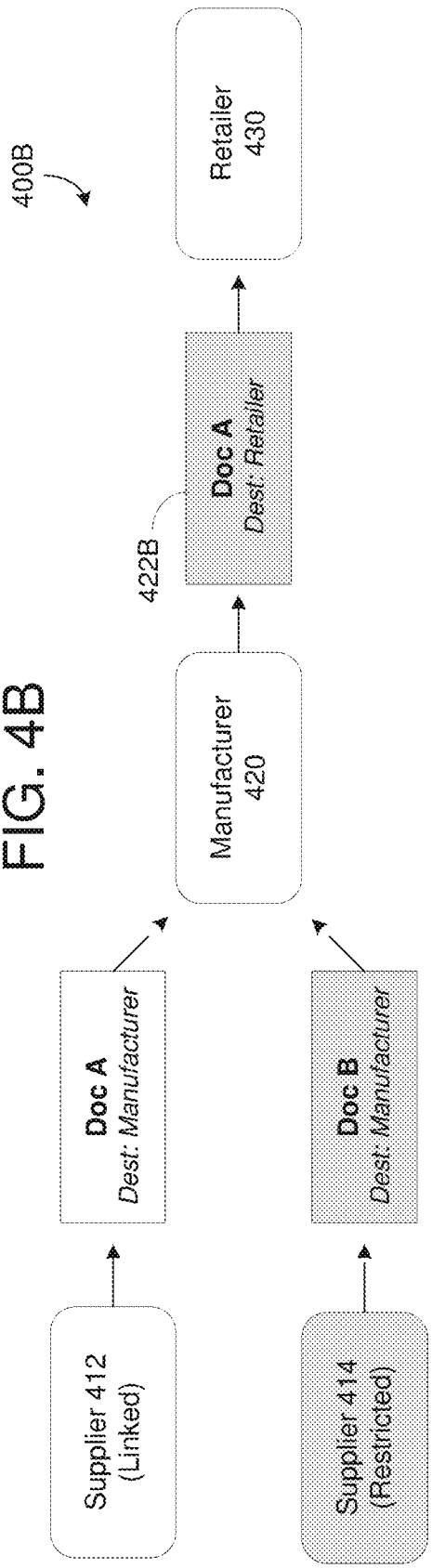

Downstream Grants 482

Upstream Grants 484

600

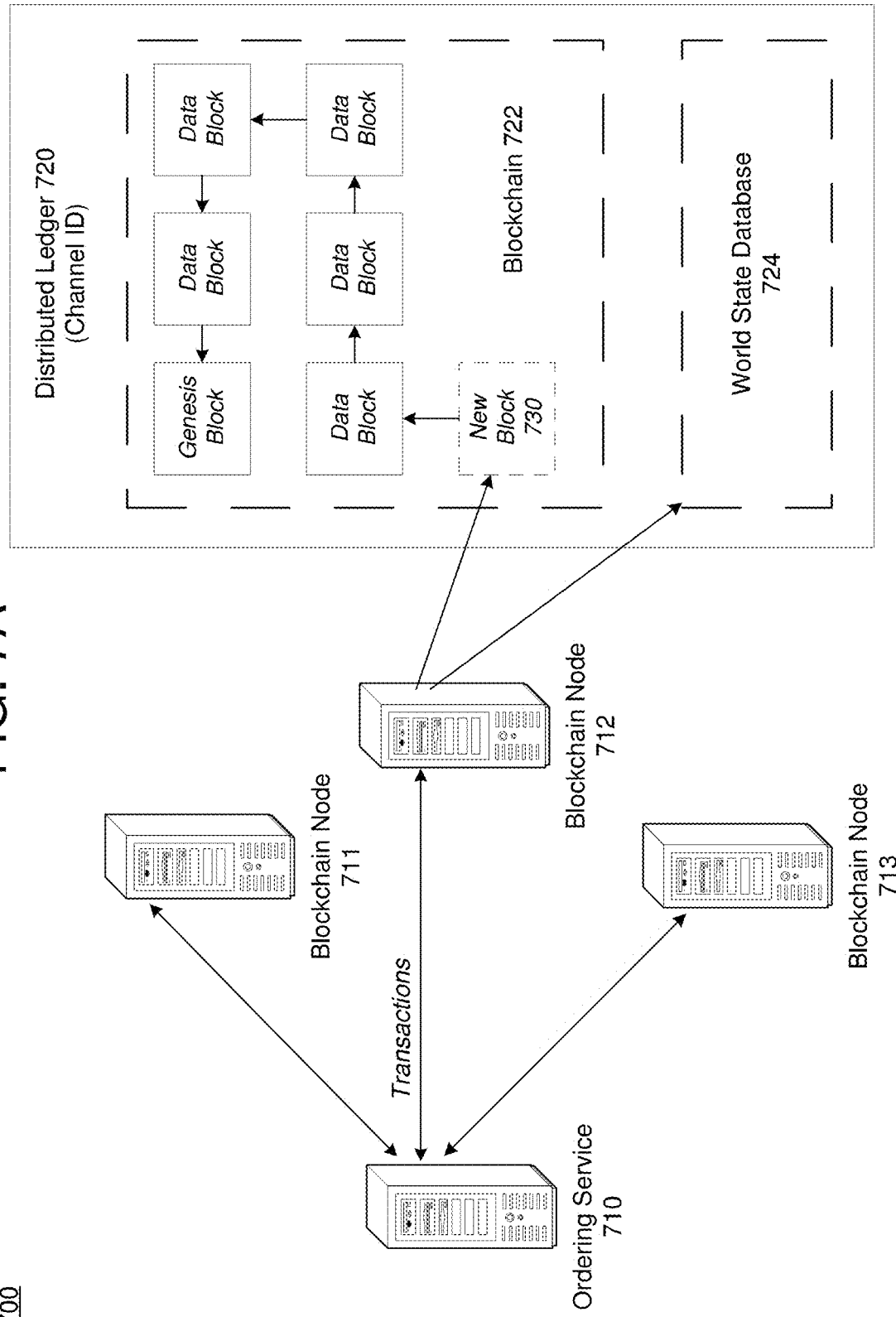

DYNAMIC ENTITLEMENT FOR BLOCKCHAIN DATA

TECHNICAL FIELD

This application generally relates to a process performed via a blockchain, and more particularly, to a system which controls visibility of data submitted to a blockchain based on various entitlement modes which can be assigned to data without a need to know the downstream nodes that will access the data.

BACKGROUND

A centralized database stores and maintains data at one location. This location is often a central computing system such as a server or a mainframe computer. Information stored on a centralized database is typically accessible from multiple different points. For example, multiple client workstations can work simultaneously on the centralized database based on a client/server configuration. Because of its single location, a centralized database is easy to manage, maintain, and control, especially for purposes of security. Within a centralized database, data integrity is maximized and data redundancy is minimized as a single storing place of all data also implies that a given set of data only has one primary record. This aids in the maintaining of data as accurate and as consistent as possible and enhances data reliability.

However, a centralized database suffers from significant drawbacks. For example, a centralized database has a single point of failure. If there is no fault-tolerance setup and a hardware failure occurs, all data within the database is lost and work of all users is interrupted. In addition, a centralized database is highly dependent on network connectivity. As a result, the slower the Internet connection, the longer the amount of time needed for each database access. Another drawback is that bottlenecks can occur when the centralized database experiences high traffic. Furthermore, the centralized database provides limited access to data because only one active/productive copy of the data is maintained. As a result, multiple users may not be able to access the same piece of data at the same time without creating overwriting. Furthermore, because a central database has minimal to no data redundancy, if a set of data is unexpectedly lost can be difficult to retrieve other than through manual operation from back-up disk storage.

Across global supply chains, financial services, healthcare, government and many other industries, innovators are exploring ways to use blockchain to disrupt and transform traditional storage into a decentralized storage scheme. Many industry leaders have already achieved significant business benefits, including greater transparency, enhanced security, improved traceability, increased efficiency and speed of transactions, and reduced costs, through the use of blockchain storage.

Typical blockchain-based supply chain solutions (as well as others) enforce access control based on a fixed set of participants who are expressly declared at a time when data is submitted. However, in many cases, the set of participants involved in the creation, distribution, handling, and/or sale of an item is not known at the time of data submission, particularly for early participants in the supply chain (e.g. suppliers of raw materials or intermediate parts). Therefore, there is a need to be able to dynamically entitle data of the supply chain for an item even in scenarios where participants are unknown at the time of data submission to the blockchain.

SUMMARY

One example embodiment may provide a system that includes one or more of a network interface configured to receive a data file submitted by a node which comprises information about an event-driven process for a chain of nodes, and a processor configured to retrieve an entitlement mode of the data file from a data block that is stored among a hash-linked chain of data blocks on a distributed ledger, and determine access rights of the data file with respect to another node in the chain of nodes based on the retrieved entitlement mode of the data file, wherein the processor is further configured to control the network interface to transmit information about the event-driven process to the other node based on the determined access rights of the other node.

Another example embodiment may provide a method that includes one or more of receiving a data file submitted by a node, the data file comprising information about an event-driven process for a chain of nodes, retrieving an entitlement mode of the data file from a data block that is stored among a hash-linked chain of data blocks on a distributed ledger, determining access rights of the data file with respect to another node in the chain of nodes based on the retrieved entitlement mode of the data file, and transmitting information about the event-driven process to the other node based on the determined access rights of the other node.

Another example embodiment may provide a non-transitory computer readable medium comprising instructions, that when read by a processor, cause the processor to perform one or more of receiving a data file submitted by a node, the data file comprising information about an event-driven process for a chain of nodes, retrieving an entitlement mode of the data file from a data block that is stored among a hash-linked chain of data blocks on a distributed ledger, determining access rights of the data file with respect to another node in the chain of nodes based on the retrieved entitlement mode of the data file, and transmitting information about the event-driven process to the other node based on the determined access rights of the other node.

BRIEF DESCRIPTION OF THE DRAWINGS

FIG. 2B is a diagram illustrating a peer node blockchain configuration, according to example embodiments.

FIGS. 4A-4B are diagrams illustrating different data entitlement modes according to example embodiments.

FIG. 7A is a diagram illustrating a process of a new block being added to a blockchain ledger, according to example embodiments.

DETAILED DESCRIPTION

Figure 1:
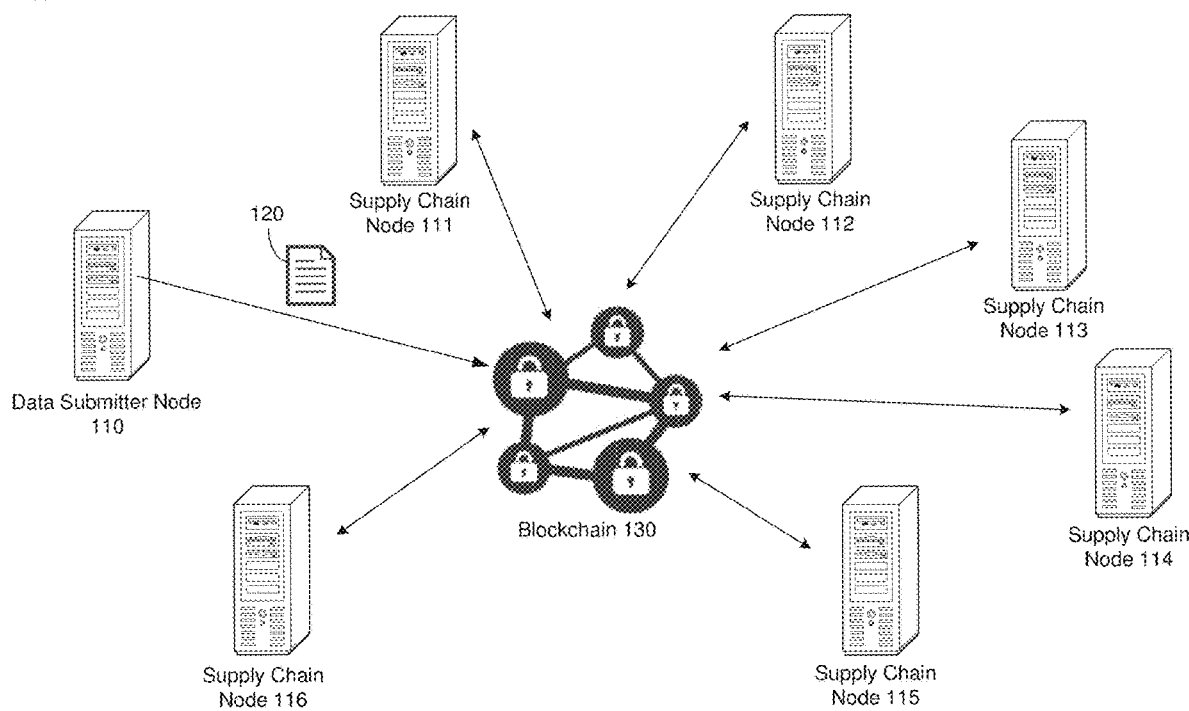
FIG. 1 is a diagram illustrating a blockchain network for a supply chain according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which ensure security and privacy through appropriate entitlement of data through a blockchain based on entitlement modes instead of requiring users to manage complex lists of business relationships or sharing agreements that need to be continuously updated when new participants are added or new supply chain flows materialize.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties may be referred to herein as peers or nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on a proof of work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Provenance scenarios (e.g. tracking the origin of food ingredients or machine parts) often involve sharing of data across participants in a supply chain. Typically, this data is shared on a party-to-party basis, which means that data is only shared and visible between two parties that are directly interacting in the supply chain. This means that discovering the provenance of an item requires coordinating between all of the participants to retrieve the necessary data they hold. Blockchain provides a natural solution which allows sharing of data between all participants in the supply chain, but privacy of the data is extremely important in order to ensure that different participants (such as competitors in a supply chain) within a same blockchain network are not able to discover information about their competitors' transactions.

Typical supply chain solutions enforce access control based on a fixed set of participants who are declared when data is submitted. This type of solution, however, is not efficient or adequate when the set of participants involved in the creation, distribution, handling, or sale of an item is unknown at the time of data submission. In particular, early participants in the supply chain (e.g. suppliers of raw materials or intermediate parts) are frequently unaware of the parties that will subsequently be involved in the manufacture, sale, etc., of their materials or parts. Therefore, there is a need to be able to dynamically entitle data as the supply chain for an item is discovered based on data submissions by the various participants.

The example embodiments overcome these drawbacks by controlling authorization for data in provenance scenarios based on entitlement mode setting which is effective even when the downstream participants related to the supply chain are unknown in advance. Other solutions typically require explicit knowledge of the set of participants, so that they can be entitled up front, or continuous maintenance of a set of permissions by the involved parties as new participants and new data are added for a flow. In contrast, the example embodiments automate the evolution of entitlements by leveraging the contents of the data in conjunction with generic entitlement modes which give the submitting node the flexibility in determining the sharing characteristics for submitted data. Unlike other permission-based schemes in the art (e.g. Linux file permissions), the entitlement modes introduced by the example embodiments have more complex semantics which are aligned to the notions of provenance of physical or digital goods.

Some benefits of the instant solutions described and depicted herein include the ability to control who and/or what has access to data during its flow through a supply chain even when the submitter is unaware of the nodes who will be receiving the data downstream. For example, upstream data may be restricted, hidden, revealed, open, or the like, based on various entitlement modes. The example embodiments implement a dynamic data entitlement system which allows participants to control visibility of data based on entitlement modes selected at the time of data submission. This entitlement scheme does not require the participant to know the eventual downstream parties in the supply chain in advance, and does not require a fixed model of the supply chain or static declaration of data sharing relationships. The entitlement may be scaled to arbitrarily large numbers of participants, without requiring an individual participant to maintain an growing/increasing list of data sharing rules. Furthermore, the system allows flexibility in determining how far up and down the supply chain information is shared.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

According to various aspects, inherent blockchain properties such as security and privacy features ensure that unauthorized participants are not able to view data. Immutability and the decentralized/distributed nature of the ledger prevent the data stored on the blockchain ledger from being altered in ways that would contradict or invalidate the entitlement decisions that are recorded by the system. In contrast, if the system herein were implemented via a traditional database, the resultant solution would not provide the same trust guarantees to the participants thereof.

FIG. 1 illustrates a blockchain network 100 for a supply chain according to example embodiments according to example embodiments. Supply chains may include materials, manufacturing, retail sales, transportation, delivery, and the like, of materials and products generated as a result of a collaborative effort among multiple untrusting parties. In the example of FIG. 1, a plurality of supply chain nodes 110-116 are connected to each other via a network (not shown) such as the Internet, and they each share access to a blockchain 130. Each of the supply chain nodes 110-116 may correspond to peer nodes in a blockchain environment which each store a replica of the blockchain. Supply chain information may be stored on the blockchain as a product moves along an event-driven process chain.

According to various embodiments, a submitting node 110 may submit a data file 120 such as a document (e.g., XML, spreadsheet, table, word processor, etc.) to the blockchain as part of an event within the event-driven process chain among one or more other supply chain nodes 111-116. It should be appreciated, that not all supply chain nodes 110-116 may participate in an event-driven process (such as a manufacturing of products, etc.). The data file 120 may include despatch advice such as used within the shipping industry.

For example, the data file 120 may include content of a shipment from a sender to a receiver such as two nodes among the supply chain nodes 110-116. The content of the data file may include information about materials, parts, manufacturing, retail information, and the like. The despatch advice can be used by the receiver to verify that the goods actually received correspond to the purchase order specifications. For example, the despatch advice may provide information about the material (raw materials, goods, parts, etc.) that has been despatched or will be ready for despatch, precise details of the consignment, initial steps towards customs clearance in the case of international consignments, and enable matching between despatched goods and the following invoice.

According to various embodiments, the submitting node 110 may set an entitlement mode for the data file 120 for future nodes that are included in the event-driven process chain. For example, the entitlement mode include a private mode that indicates that the data should not be entitled to any participants other than the submitter of the data, an open mode which indicates that the data should be entitled to all participants in the solution, a linked mode that specifies that the data should be entitled to all participants that are involved in the supply chain flow (e.g., event drive process chain) for the specified item(s) referenced by the data file 120, a restricted mode that denotes that the data should be entitled only to participants that are explicitly referenced by the data, and the like.

As the supply chain progresses through the events, each of the nodes involved in a particular event-driven process chain may record their information on the blockchain and it may be replicated among the nodes. Meanwhile, nodes that are restricted or prevented from receiving certain portions of the supply chain information may not be given a key or a password for opening information such as the data file 120, whereas nodes that are allowed to see the data file 120 may be given the key, password, etc.

Each node involved in the supply chain may submit a data file (such as despatch advice) which specifies a destination node for the despatch advice. Based on this information, the entitlement mode can be configured such as in the example of a linked mode or a restricted mode. However, in some cases, all nodes in the network 100 may access a data file when the entitlement node is set to open. Meanwhile, all nodes in the network 100 may be prevented from accessing the data file when the entitlement mode is set to private.

Figure 2A:
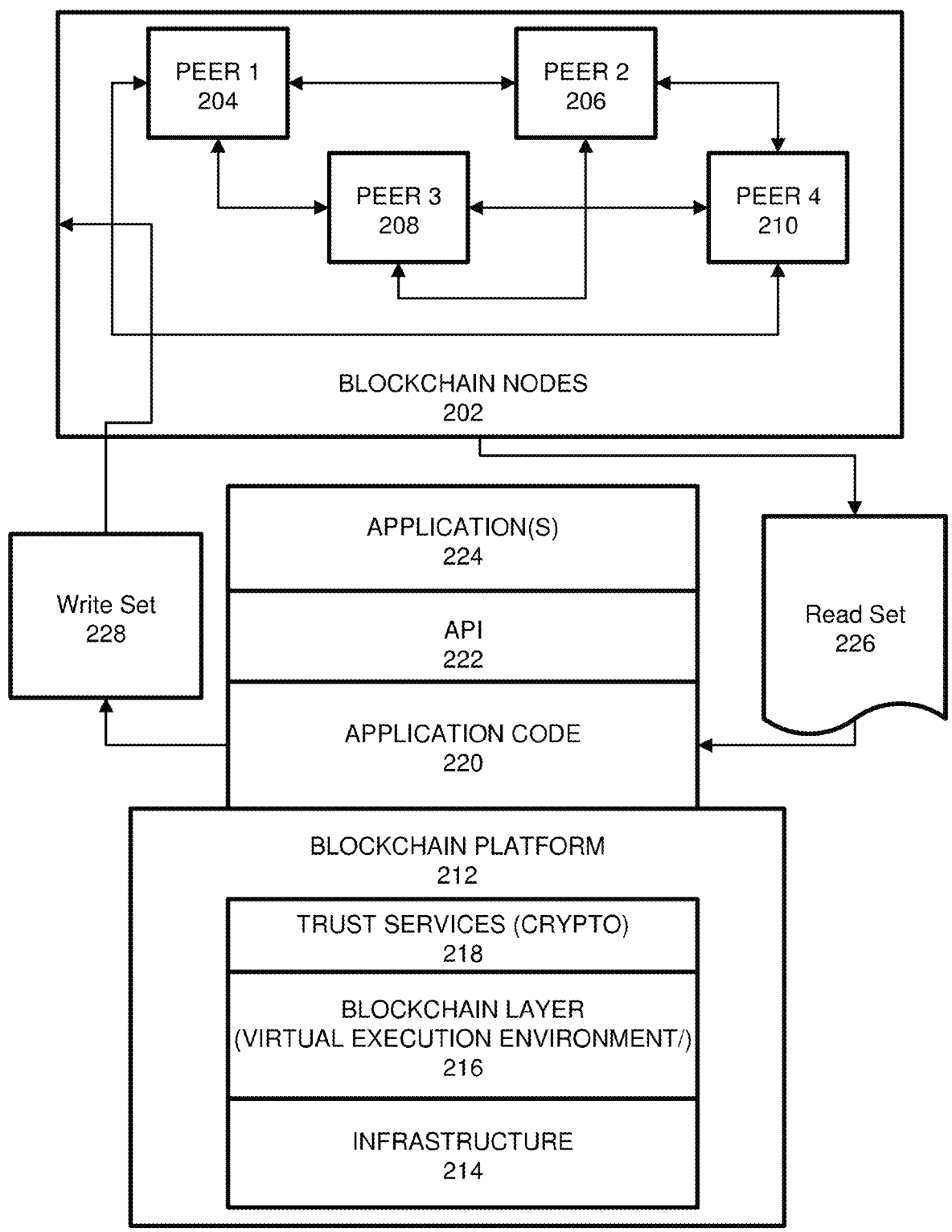
FIG. 2A is a diagram illustrating a peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on an endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. In this example, a read set 226 may be processed by one or more processing entities (e.g., virtual machines) included in the blockchain layer 216. A write set 228 may include changes to key values. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain.

The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified. According to various embodiments, the read set 226 may include a current processing step of the multi-party process. Meanwhile, the write set 228 may include the execution results of the processing step which may include an identification of the step, sending and receiving events performed during the processing step, and the like.

A chaincode may include the code interpretation of a smart contract, with additional features. As described herein, the chaincode may be program code deployed on a computing network, where it is executed and validated by chain validators together during a consensus process. The chaincode may be generated based on a plurality of state charts of a blockchain and a plurality of off-chain systems. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

The client node 260 may initiate the transaction 291 by constructing and sending a request to the peer node 281, which is an endorser. The transaction proposal 291 may include a request to store information about execution results of a sub-component of a software model. There may be more than one endorser, but one is shown here for convenience (i.e., peer node 281). The client 260 may include an application (e.g., web application, etc.) that leverages a supported software development kit (SDK), such as NODE, JAVA, PYTHON, and the like, which utilizes an available API to generate a transaction proposal. The transaction proposal 291 is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. According to various embodiments, the transaction results may include a result of executing a current step of the multi-party process. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID, as well as the timestamp information and multi-party process information described herein such as an identification of the current step executed, send and receive events performed during the step, and the like. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
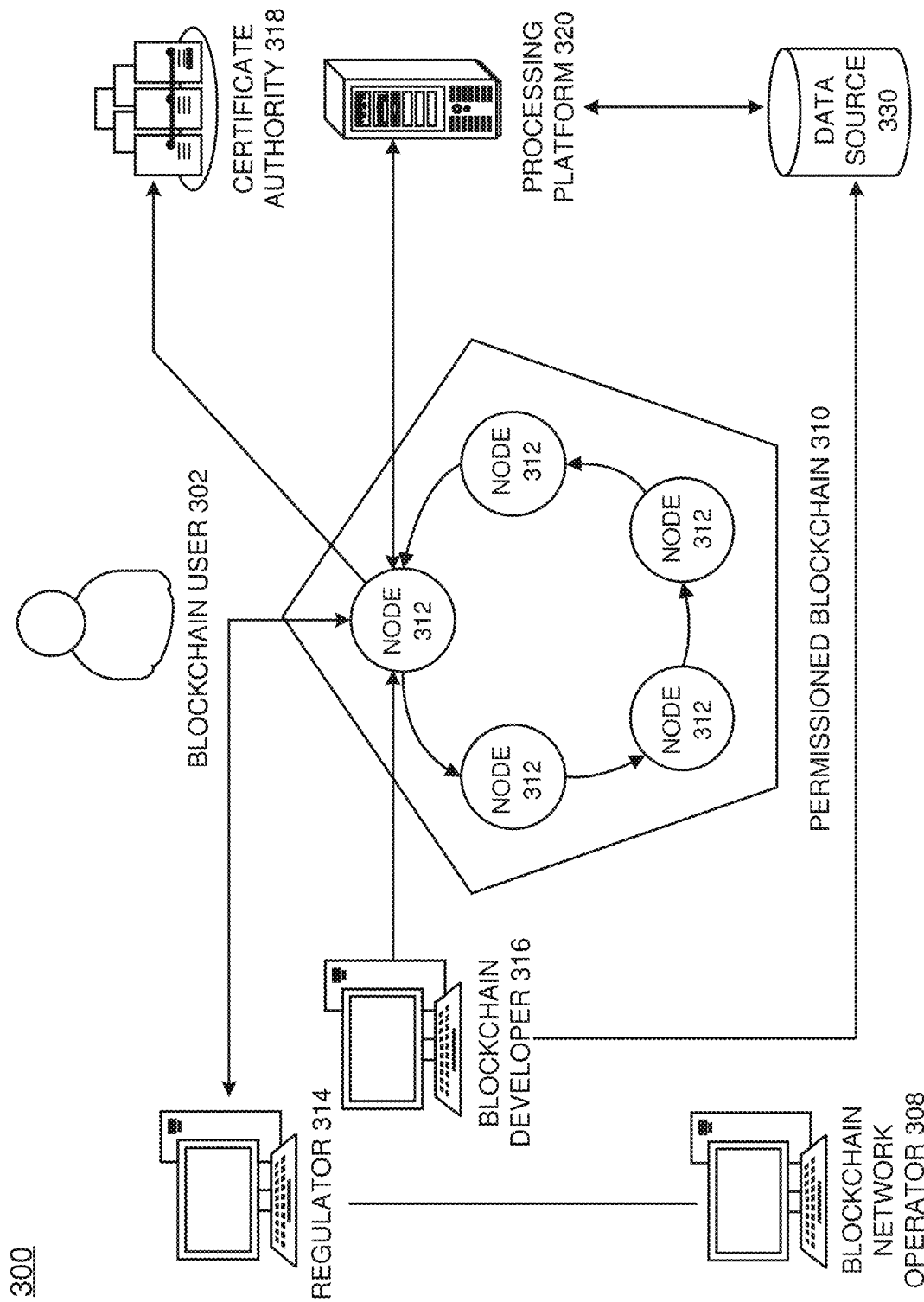
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

FIGS. 4A-4B illustrate implementation of different data entitlement modes during an event-driven process chain according to example embodiments. In particular, FIG. 4A illustrates a process 400A of a downstream node 430 receiving access to data via implementation of a linked entitlement mode and FIG. 4B illustrates a process 400B of the downstream node 430 receiving access to some data while not receiving access to other data via implementation of a linked entitlement mode in combination with a restricted entitlement mode.

Referring to FIG. 4A, an upstream node 412 submits a data file (doc A) via a despatch advice and an upstream node 414 submits a data file (doc B) via a despatch advice. In this example, both the upstream nodes 412 and 414 set the respective data files with an entitlement mode of "linked" which provides access to the data file to all supply chain nodes that are related to the supply chain. For example, the linked entitlement mode may enable all nodes who participate in a supply chain to see the upstream data (e.g., document A and document B). In some embodiments, the nodes who participate in the supply chain may be a subset of nodes within a larger supply chain blockchain network (such as network 100 shown in FIG. 1). In the example of FIG. 4A, because both upstream nodes 412 and 414 have set the entitlement mode to linked, the node downstream nodes which are unknown at the time of submission will have access to the document A and document B.

In the example of FIG. 4A, both the upstream nodes 412 and 414 correspond to material suppliers who provide materials to a manufacturer of goods represented by manufacturing node 420. Here, the upstream nodes may specify a destination of the manufacturing node 420. This may be identified from despatch advice (such as the receiver information, etc.) The destination may also be specified by a IP address, a geographic address, etc. At the time of submission, neither upstream nodes 412 and 414 are aware of the downstream nodes after the manufacturing node 420. However, be setting the entitlement mode to linked, they have each enabled other downstream nodes to see the document A and the document B. In this example, the manufacturing node 420 sends manufactured goods to retailer node 430. Here, the retailer node 430 is given permission to view both document A and document B submitted by upstream node 412 and upstream node 414 corresponding to material suppliers.

For events having documents or other files which are specified as linked entitlement, the sharing happens when an event references another organization's location global location number (GLN), either as a source or destination location. For example, a submitting node referencing an upstream partner's location as the source of an event enables upstream parties in the supply chain to see the event. As another example, referencing a downstream partner's location as the destination of an enables downstream parties in the supply chain to see the event. This sharing applies to all linked events for the same event-driven process but not to events that reference some other party's location. For example, if Retailer A and Retailer B are both downstream partners of Supplier1, Supplier1's events that list Retailer A's location as a destination won't be shared with Retailer B.

In this example, we describe how location references can be used for the purposes of granting entitlements to other organization (i.e., on the basis of referencing the other org's GLN). The location references can include other general forms of location identifiers or organizational identifiers (such as DUNS number). We should also generalize to include other types of references, for example, entitlement could be granted based on referencing another party's product identifier (GTIN) or a business transaction identifier (such as a Purchase Order number) that can be uniquely tied to a particular organization. In the general case, these references could be determined on the basis of several fields present in the data.

The system herein may use company prefixes to determine organizational ownership for the purposes of data entitlement. Every onboarded organization may have one or more company prefixes, which can be GS1 prefixes, IFT prefixes, or the like, which are assigned by the systems herein (e.g., in case the organization does not have any GS1 registered company prefix). During data entitlement, a location GLN reference is matched against the set of known, validated company prefixes, and the associated organization for the company prefix receives entitlement to the data (based on the entitlement mode of the submitted document).

Referring now to FIG. 4B, all of the details shown and described in FIG. 4A are the same except that in process 400B the second upstream node 414 has set the entitlement of document B as "restricted" entitlement mode instead of "linked" entitlement mode. As a result, instead of the downstream node 430 (retailer node) receiving access to document B submitted by second upstream node 414, the downstream node 430 only receives access to document A submitted by first upstream node 412 which is set to linked mode. In these examples, the manufacturing node 420 receives access to both document A and document B, because the manufacturing node 420 is specifically listed as a destination in the despatch advice sent by the second upstream node 414. That is, the restricted access may allow access rights to nodes in the supply chain who are expressly listed as destinations, but not unlisted destinations. Meanwhile, the linked access rights are given to all nodes in the supply chain regardless of whether they are expressly listed as a destination. In some embodiments, the "restricted" entitlement mode could be further generalized to be "restricted(N)", where N would specify the number of hops in the supply chain that would have visibility to the data. For example, "restrict d(1)" would be equivalent to what we described as "restricted".

Entitlement modes dictate the sharing characteristics for a piece of data in a generic way, which is independent of the names or identities of specific parties or participants that might be authorized to the data. When combined with the contents of the data (and the contents of other pieces of data that reference the same item(s)), the entitlement mode is used to determine the specific participants that are entitled to the data. Initial entitlements for a piece of data are determined at the time of submission, and can rely upon not only the contents (e.g., destination receiver, etc.) of the submitted piece of data itself, but also entitlements granted by previously submitted data (upstream nodes). As additional data is submitted to the solution, those new submissions can also cause the entitlements of previously submitted data to be updated.

The example embodiments provide a novel way to control authorization for data in provenance scenarios where the eventual participants submitting data related to an item's provenance is not known, in advance. Other solutions either require explicit knowledge of the set of participants, so that they can be entitled up front, or continuous maintenance of a set of permissions by the involved parties as new participants and new data are added for a flow. In contrast, the example embodiments automates this evolution of entitlements by leveraging the contents of the data in conjunction with generic entitlement modes which give the user flexibility in determining the sharing characteristics for submitted data.

Figure 4C:
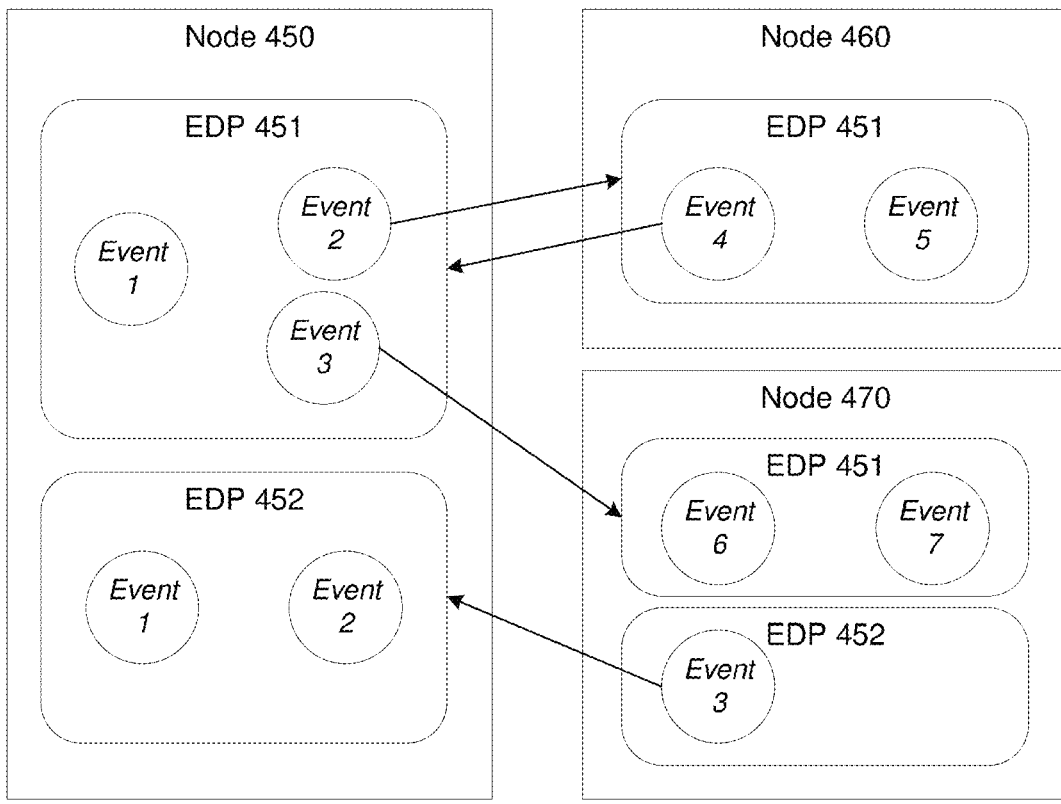
FIG. 4C is a diagram illustrating visibility of data events among supply chain participants according to example embodiments.
Figure 4C:
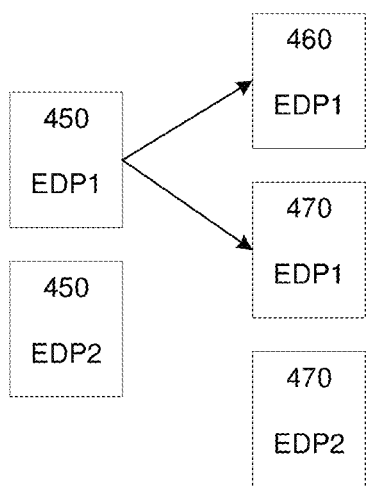
Figure 4C:
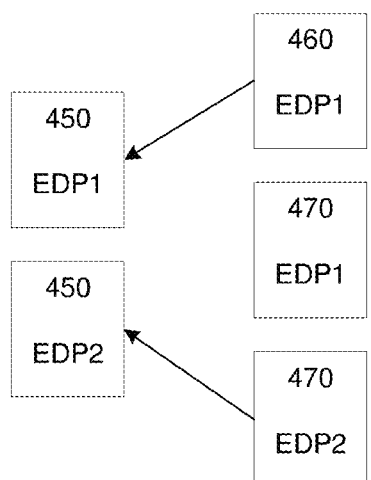

FIG. 4C illustrates an overview of visibility of data events among supply chain participants according to example embodiments. In the examples herein, assumptions may be made including that each event may be owned by an organization, and the ownership of each event is known. Each location may be owned by an organization, and the ownership of each location is known. For example, an organization O can grant access to a downstream organization D for a specific event driven chain E, by generating at least one event (owned by O) which refers to E and has at least one destinationList.destination set to a location owned by D. This grant allows D to access all events about E owned by O except events whose destinations are locations not owned by D. Technically, the excluded events are events with non-empty destination lists with no destinationList.destination owned by D. In particular, this grant allows D access to all events about E owned by O which have no destination information. This grant is transitive i.e. it also allows D to access all events about E owned by organizations upstream of O, that O has access to.

As another example, an organization can also grant access to upstream nodes. For example, an organization O can grant access to an upstream organization U for a specific event-driven process, by generating at least one event (owned by O) which refers to E and has at least one sourceList.source set to a location owned by U. This grant allows U to access all events about E owned by O except events whose sources are locations not owned by U. Technically, the excluded events are events with non-empty sourceList with no sourceList.source owned by U. In particular, this grant allows U access to all events about E owned by O which have no source information. This grant is transitive i.e. it also allows U to access all events about E owned by organizations downstream of O, that O has access to.

FIG. 4C shows an example of event data across three different organizations represented by three nodes 450, 460, and 470. In this example, a first organization which controls node 450 owns three events (E1, E2, E3) of a first event-driven process 451, and two events (E1, E2) of a second event-driven process 452. Of these, events E1 from EDP 451 and E1 and E2 from EDP 452 contain no source or destination. Meanwhile, event E2 of EDP 451 has destinationList.destination set to a location owned by the second organization represented by node 460. Similarly, event E3 has destinationList.destination set to a location owned by the third organization which controls node 470.

Here, the second organization which controls node 460 owns two events (E4, E5) of the first-event driven process 451. Of these, event E5 contains no source/destination information. Meanwhile, event E4 has a sourceList.source set to a location owned by the first organization which controls node 450. Meanwhile, the third organization which controls node 470 owns two events (E6, E7) for the first event-driven process 451, and one event (E3) for the second event-driven process 452. Of these, events E6 and E7 contain no source/destination information. Meanwhile, event E3 has sourceList.source set to a location owned by the first organization which controls node 450.

Based on this information, downstream grants 482 and upstream grants 484 can be reasoned. For example, reason about access grants may be determined based on the basic principles listed above. First, access grants to downstream organizations: Because of E2 in EDP 451, the second organization which controls node 460 can access all events about EDP 451 which are owned by the organization which controls node 450, except events with explicit destinations of other organizations/nodes. Thus the second organization which controls node 460 can access events E1 and E2, but not E3 which is expressly destined for the third organization that controls node 470. Likewise, the second organization cannot access any of E1 or E2 in the second EDP 452. Similarly, because of E3, the third organization which controls node 470 can access E1 and E3 of EDP 451, but not E2 which is expressly destined for node 460.

Likewise, access grants to upstream organizations can be determined. For example, because of E4 of EDP 451, the first organization which controls node 450 can access all events about EDP 451 which are owned by the second organization which controls node 460, except events with explicit non-first organization sources. Thus node 450 can access events E4 and E5. Similarly, because of E3 of the second EDP 452, the node 450 can access all events about the second EDP 452 which are owned by the third organization including E3.

The example of FIG. 4C illustrates two points about the new access-control model. For example, access grants are not symmetric. In other words, node 450 cannot access events about EDP 451 owned by node 470, even though node 470 can access events about EDP 451 that are owned by node 450. Furthermore, an organization can only grant access to other organizations; it can never unilaterally claim access to other organizations' data. This prevents malicious linkages. In this example, access grants are not symmetric. In another embodiment, access grants could be required to be symmetric before data is made visible. This could be useful in situations where bi-directional sharing is desired for contractual reasons, or to help to ensure that documents are inadvertently shared due to mistakes in data.

The grants implied by a set of events can be summarized by constructing a downstream and an upstream access grant graph (AGG), as shown in the example above. An event about an event-driven process Li, owned by organization Oj, with destination location owned by organization Ok, creates an edge from node (Oj, Li) to node (Ok, Li) in the downstream AGG. Similarly, an event about an event-driven process Li, owned by organization Oj, with source location owned by organization Ok, creates an edge from node (Oj, Li) to node (Ok, Li) in the upstream AGG.

The access right of an organization to event data belonging to another organization can then be determined on the basis of the event-driven processes involved in the events, and AGGs. Specifically, the transitivity of access grants described above implies that a necessary condition for an organization Oj to have access to event data belonging to another organization Ok, about event-driven process Li, is that there should be a path from node (Ok, Li) to node (Oj, *) in either the upstream or the downstream AGG. The reason this is necessary but not sufficient is that other conditions might pre-empt access even if the above condition is satisfied. For example, assume that there is an edge in the downstream AGG from node (Ok, Li) to node (Oj, Li). This does not allow organization Oj to see events about event-driven process Li belonging to organization Ok which have explicit non-Oj destinations. As another example, organization Ok might have an access policy explicitly forbidding sharing with organization Oj, even if the above condition is satisfied; such policies would be expressed through organization-specific ACLs, which "over-ride" the default access control.)

Figure 5:
FIG. 5 is a diagram illustrating a method of determining access rights for a downstream node according to example embodiments.

FIG. 5 illustrates a method 500 of determining access rights for a downstream node according to example embodiments. For example, the method 500 may be performed by a blockchain peer node that may be a computing system. As another example, the method 500 may be performed by an off-chain system such as a server, a database, a user device, a combination of devices, and the like. In some embodiments, the method 500 may be performed by a combination of any of the systems.

Referring to FIG. 5, in 510, the method may include receiving a data file submitted by a node among a chain of nodes such as a supply chain. For example, the data file may include information about an event-driven process for a chain of nodes. For example, the data file may include despatch advice (e.g., XML despatch, etc.) which includes content of a shipment from a sender to a receiver. The content of the data file may include information about materials, parts, manufacturing, retail information, and the like. The despatch advice can be used by the receiver to verify that the goods actually received correspond to the purchase order specifications. For example, the despatch advice may provide information about the material (raw materials, goods, parts, etc.) that has been despatched or will be ready for despatch, precise details of the consignment, initial steps towards customs clearance in the case of international consignments, and enable matching between despatched goods and the following invoice.

As another example, the data file may include other data that is associated with the events/transaction data, such as master data describing products, product lots, or facilities, or certificates or other pieces of data that are associated with products, product lots, or facilities. For example, a piece of product master data with linked entitlement mode may be shared with any party who has visibility to data submitted by the product owner that references the product's identifier (GTIN) and the same can be true for location/facility master data based on GLN references.

In 520, the method may include retrieving an entitlement mode of the data file from a data block that is stored among a hash-linked chain of data blocks on a distributed ledger. Examples of the entitlement mode include a private mode that indicates that the data should not be entitled to any participants other than the submitter of the data, an open mode which indicates that the data should be entitled to all participants in the solution, a linked mode that specifies that the data should be entitled to all participants that are involved in the supply chain flow for the specified item(s) referenced by the data, a restricted mode that denotes that the data should be entitled only to participants that are explicitly referenced by the data, and the like.

In 530, the method may include determining access rights of the data file with respect to a downstream node in the chain of nodes based on the retrieved entitlement mode of the data file. It should also be appreciated that access rights may be determined for upstream nodes as well. The access rights may include the ability to receive the data file or the inability of the node to view the data file. The access rights may be determined based on the entitlement mode that is set by the upstream node. Furthermore, in 540, the method may include transmitting information about the event-driven process to the downstream node based on the determined access rights of the downstream node. If the access rights enable access to the data file the transmitting may include the data file as well as the responsibility of the downstream node in the event-driven process. If the access rights deny access to the data file, the transmitting may include the responsibility of the downstream node without the data file from the upstream node.

In some embodiments, the data file (e.g., the despatch advice, etc.) may expressly define the computing node as a geographic destination of the data file, but may not define any other downstream nodes as a geographic destination of the upstream data file. In this example, the computing node may be given access rights to the despatch advice in a restricted entitlement mode because the computing node is specifically listed as a destination node. Meanwhile, other downstream nodes may be restricted or prevented from seeing the despatch advice of the upstream node because they are not specifically listed as a destination of the despatch advice. Meanwhile, in a linked entitlement mode, all nodes in the supply chain (even the nodes not known at the time of the submission of the despatch advice) may be granted access to the data file of the upstream node. As another example, the determining may include determining to reveal the data file to blockchain nodes outside the event-driven process in response to the retrieved entitlement mode indicating an open mode. As another example, the determining may include determining to hide content of the data file from all subsequent downstream nodes in response to the retrieved entitlement mode indicating a private mode.

Figure 6A:
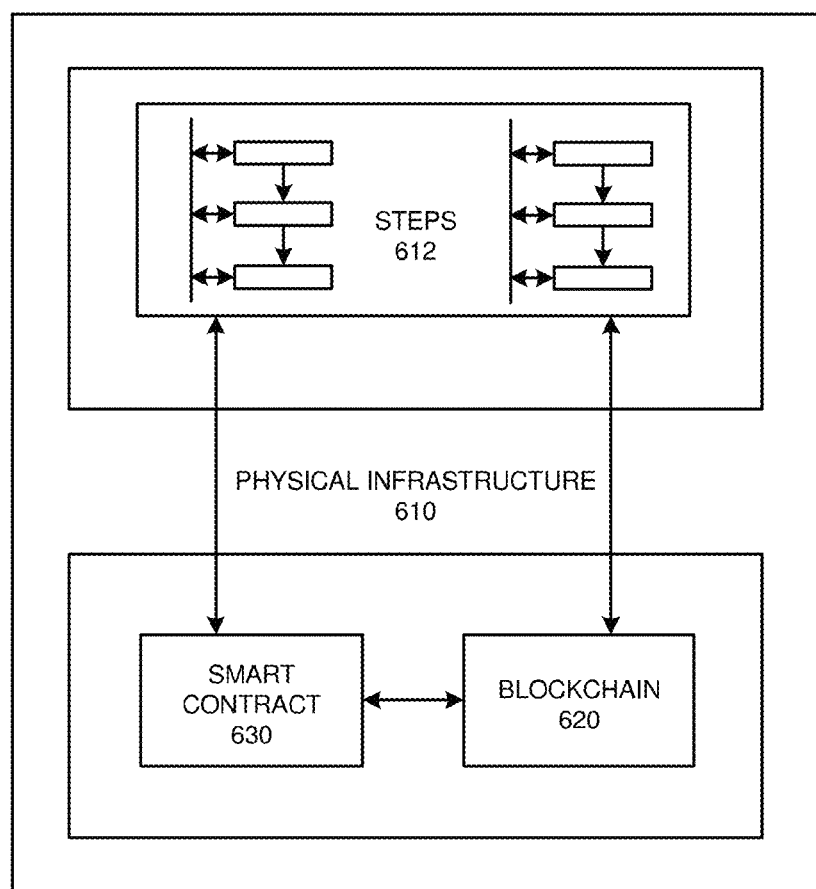
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 630, which may execute any of the operational steps 612 included in any of the example embodiments. The steps 612 may represent output or written information that is written or read from one or more smart contracts 630 and/or blockchains 620 that reside on the physical infrastructure 610 of a computer system configuration. The data can be output from an executed smart contract 630 and/or blockchain 620. The physical infrastructure 610 may include one or more computers, servers, processors, memories, and/or wireless communication devices.

Figure 6B:
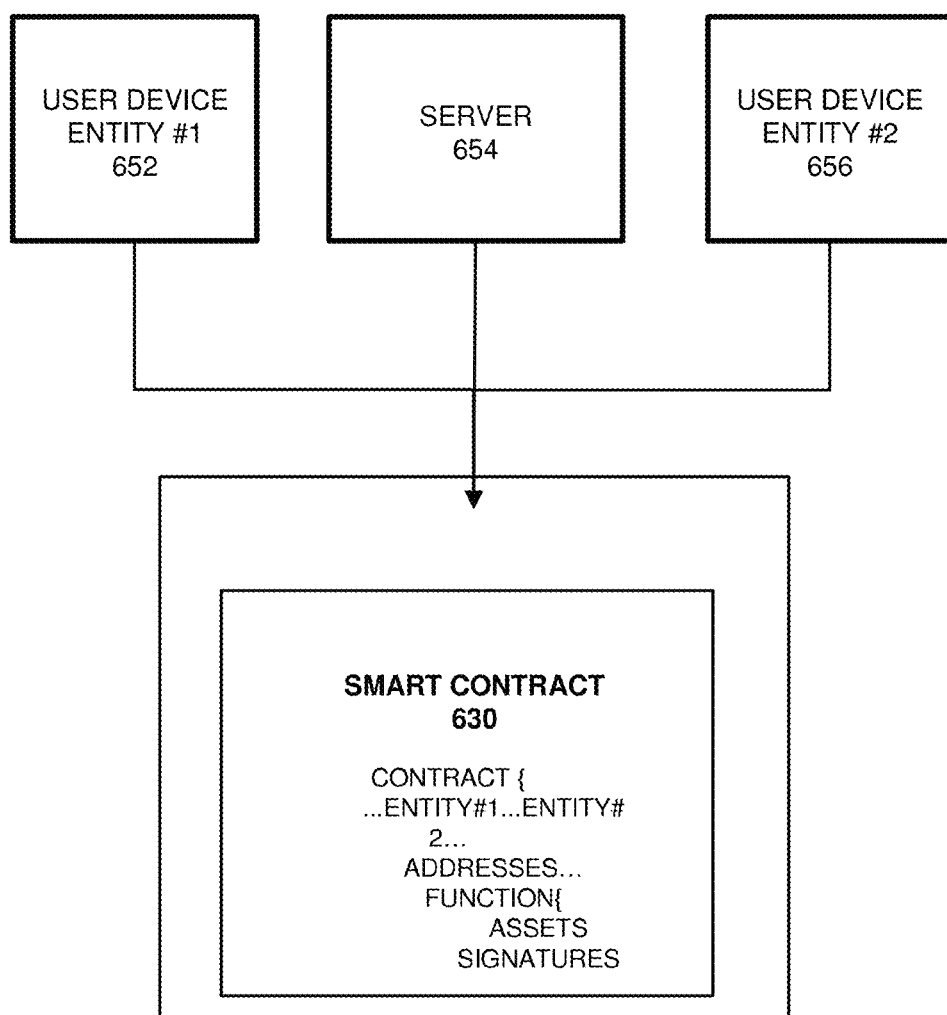
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a multi-party process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain as a blockchain transaction.

Figure 6C:
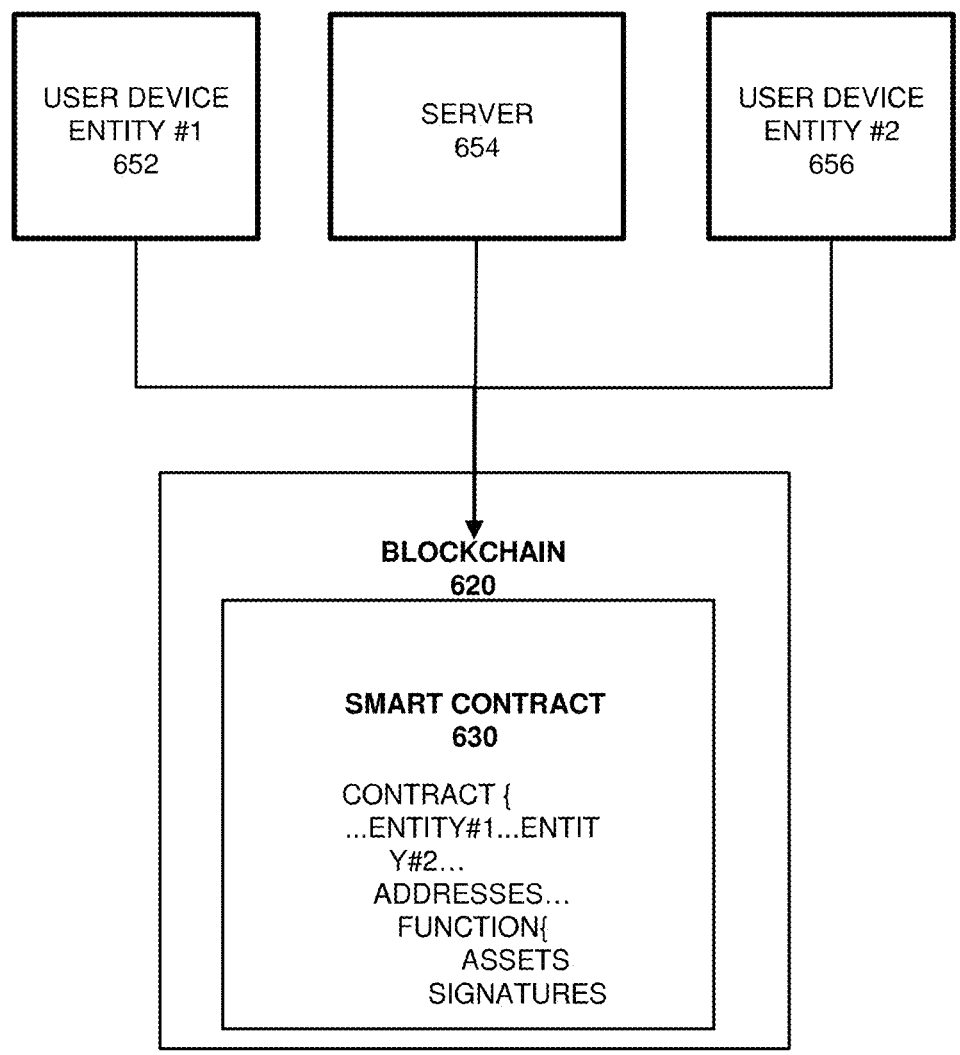
FIG. 6C is a diagram illustrating a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a modified data file authentication session, a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
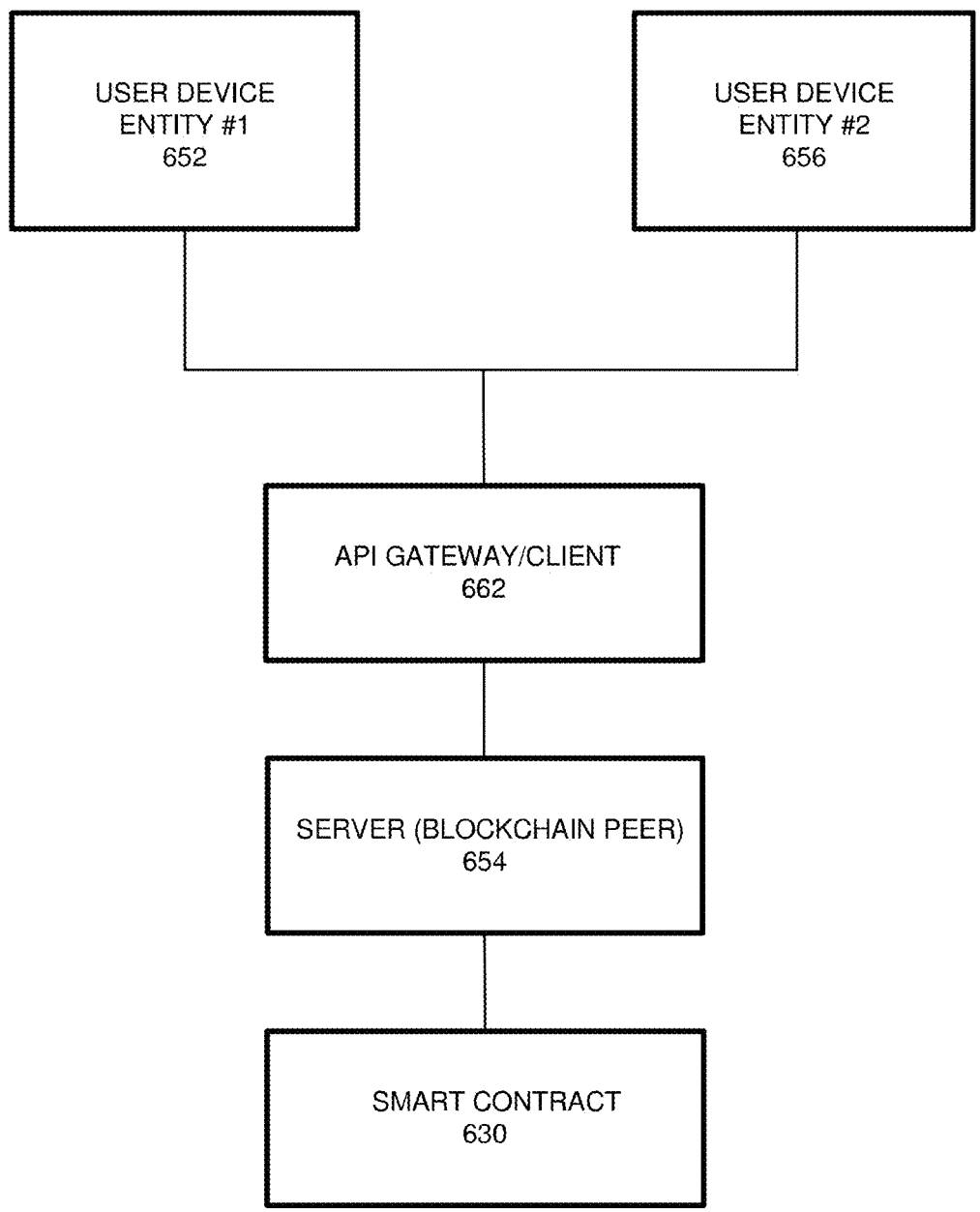
FIG. 6D is a diagram illustrating another example blockchain-based smart contact system, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). The server 654 is a blockchain network peer component that holds a copy of the world state (which may include a key value store) within a distributed ledger allowing clients 652 and 656 to query data on the world state as well as submit transactions into the blockchain network where, depending on the smart contract 630 and endorsement policy, endorsing peers will run the smart contracts 630.

Figure 7B:
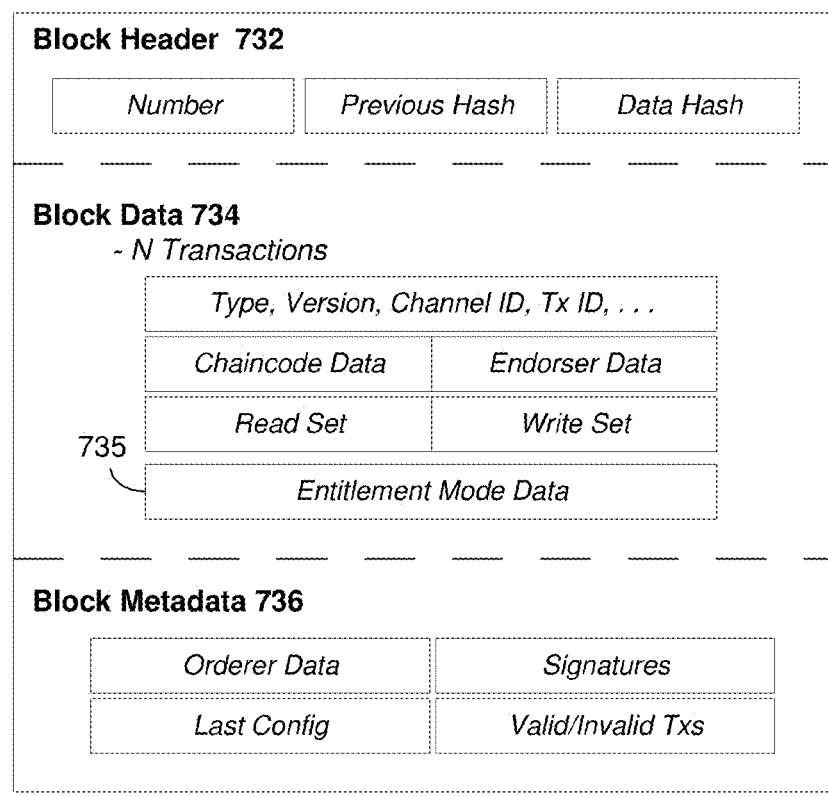
FIG. 7B is a diagram illustrating contents of a data block structure for blockchain, according to example embodiments.

FIG. 7A illustrates a process 700 of a new block 730 being added to a distributed ledger 720, according to example embodiments, and FIG. 7B illustrates contents of a block structure 730 for blockchain, according to example embodiments. Referring to FIG. 7A, clients (not shown) may submit transactions to blockchain nodes 711, 712, and/or 713. Clients may be instructions received from any source to enact activity on the blockchain. As an example, clients may be applications (based on a SDK) that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720.

Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both. As described herein, transactions may include send events, receive events, storage events, and the like of a multi-party process that is carried out between multiple untrusted organizations.

The distributed ledger 720 includes a blockchain 722 which stores immutable, sequenced records in blocks, and a state database 724 (current world state) maintaining a current state (key values) of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks (e.g., block 730) may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 720 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys may be stored in the state database 724. The state database 724 may include an indexed view into the transaction log of the blockchain 722 and can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. For an authentication, the endorsing node may attempt to decrypt a hashed modified data file using a public key of the node that performed the hash. The nodes needed to endorse a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data block 730 for storage on blockchain 722.

The ordering service 710 may be made up of a cluster of orderers. The ordering service 710 does not process transactions, smart contracts, or maintain the shared ledger. Rather, the ordering service 710 may accept the endorsed transactions, and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network such as chronological ordering.

When the ordering service 710 initializes a new block 730, the new block 730 may be broadcast to committing peers (e.g., blockchain nodes 711, 712, and 713). In response, each committing peer validates the transaction within the new block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a block 730 (also referred to as a data block) that is stored on the blockchain 722 of the distributed ledger 720 may include multiple data segments such as a block header 732, block data 734, and block metadata 736. It should be appreciated that the various depicted blocks and their contents, such as block 730 and its contents shown in FIG. 7B are merely for purposes of example and are not meant to limit the scope of the example embodiments. In some cases, both the block header 732 and the block metadata 736 may be smaller than the block data 734 which stores transaction data, however this is not a requirement. The block 730 may store transactional information of N transactions (e.g., 100, 500, 1000, 2000, 3000, etc.) within the block data 734.

The block 730 may also include a link to a previous block (e.g., on the blockchain 722 in FIG. 7A) within the block header 732. In particular, the block header 732 may include a hash of a previous block's header. The block header 732 may also include a unique block number, a hash of the block data 734 of the current block 730, and the like. The block number of the block 730 may be unique and assigned in an incremental/sequential order starting from zero. The first block in the blockchain may be referred to as a genesis block which includes information about the blockchain, its members, the data stored therein, etc.

The block data 734 may store transactional information of each transaction that is recorded within the block 730. For example, the transaction data stored within block data 734 may include one or more of a type of the transaction, a version, a timestamp (e.g., final calculated timestamp, etc.), a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

According to various embodiments, in addition to traditional blockchain-based information, the block data 734 may also store entitlement data 735 that may include an entitlement mode of a data file or other data chunk that is submitted. The entitlement data 735 may be stored within the blockchain within a transaction when a predetermined number of nodes have endorsed the transaction including the entitlement data 735.

The block metadata 736 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committing node of the block (such as blockchain node 712) may add validity/invalidity information based on an endorsement policy, verification of read/write sets, and the like. The transaction filter may include a byte array of a size equal to the number of transactions in the block data 734 and a validation code identifying whether a transaction was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

Figure 8:
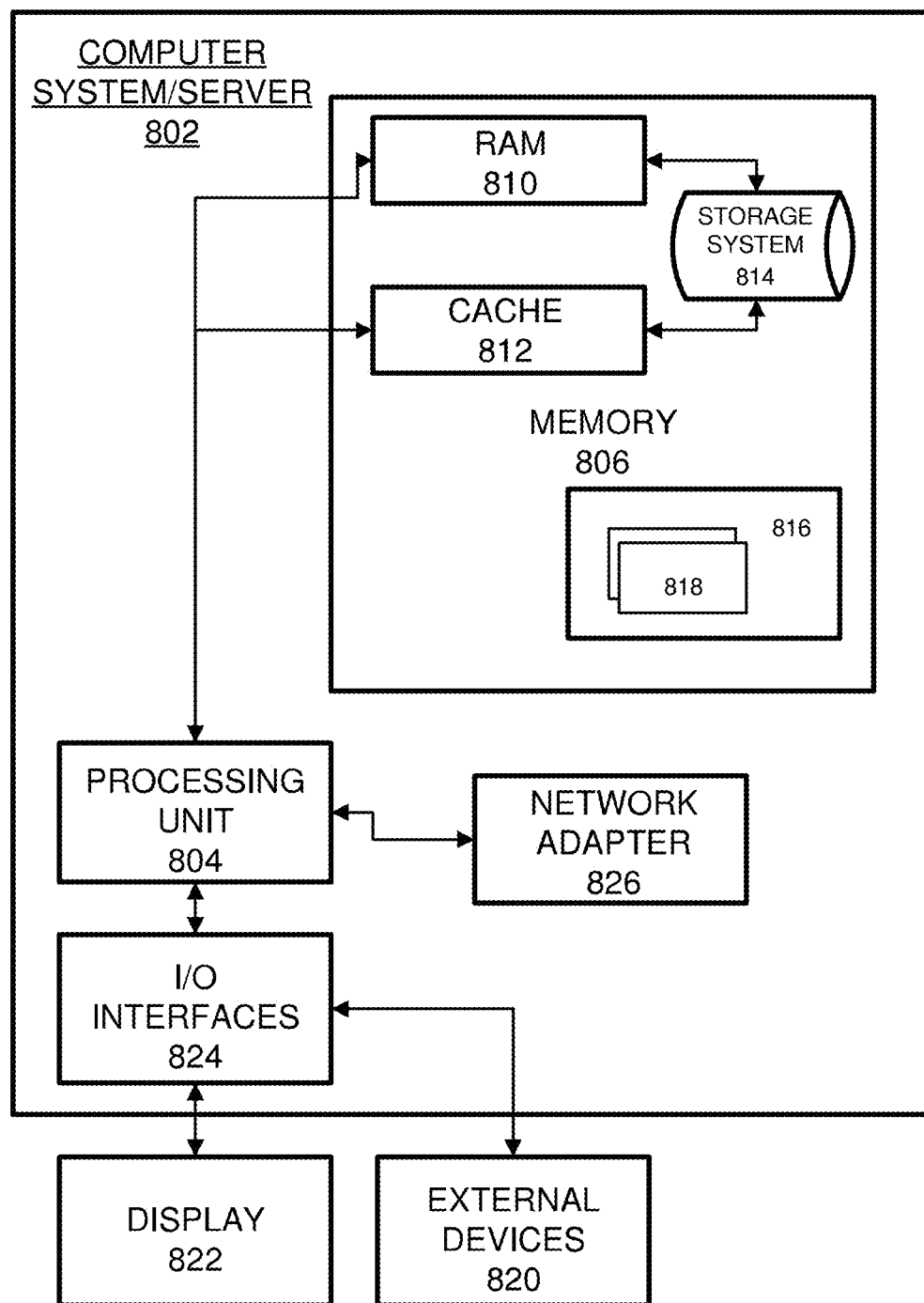
FIG. 8 is a diagram illustrating an example computer system configured to support one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove. For example, the computing node 800 may perform the method shown and described with respect to FIG. 5.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing node comprising:
    a network interface configured to receive a data file submitted by a blockchain node to a blockchain ledger, where the data file comprises information about an event-driven process of a supply chain and despatch advice for a shipment within the supply chain which includes an identifier of a destination node in the supply chain that is also a member of the blockchain ledger; and
    a processor configured to
        determine an entitlement mode of nodes within the supply chain with respect to the data file based on the dispatch advice for the shipment and one or more previously granted entitlement modes of the nodes within the supply chain, wherein the entitlement mode specifies a number of hops upstream in the supply chain that have visibility of the data file,
        receive a request for the data file from a different node in the supply chain that is also a member of the blockchain ledger, and
        control the network interface to transmit information about the event-driven process to the different node via the blockchain ledger in response to the different node being within the number of hops upstream in the supply chain specified by the entitlement mode.

2. The computing node of claim 1, wherein the processor determines to hide content of the data file from an upstream node within the supply chain which is not within the number of hops upstream in the supply chain specified by the entitlement mode.

3. The computing node of claim 2, wherein the processor transmits, to a downstream node within the supply chain, information about a responsibility of the downstream node with respect to the event-driven process.

4. The computing node of claim 1, wherein the processor determines to reveal content of a second data file to one or more upstream nodes and downstream nodes within the supply chain of the event-driven process when an entitlement mode of the second data file indicates a linked mode.

5. The computing node of claim 4, wherein the processor transmits, to a downstream node within the supply chain, the content of the second data file and information about a responsibility of the downstream node with respect to the event-driven process.

6. The computing node of claim 4, wherein the second data file expressly defines the computing node as the blockchain destination node of the second data file, but does not define any upstream or downstream nodes within the supply chain as a destination of the second data file.

7. The computing node of claim 1, wherein the processor determines to reveal a second data file to blockchain nodes outside the supply chain in response to an entitlement mode of the second data file indicating an open mode.

8. The computing node of claim 1, wherein the processor determines to hide content of a second data file from all subsequent upstream and downstream nodes within the supply chain when an entitlement mode of the second data file indicates a private mode.

9. A method of a computing node, comprising:
receiving a data file submitted by a blockchain node to a blockchain ledger, where the data file comprises information about an event-driven process of a supply chain and despatch advice for a shipment within the supply chain which includes an identifier of a destination node in the supply chain that is also a member of the blockchain ledger;
determining an entitlement mode of nodes within the supply chain with respect to the data file based on the dispatch advice for the shipment and one or more previously granted entitlement modes of the nodes within the supply chain, wherein the entitlement mode specifies a number of hops upstream in the supply chain that have visibility of the data file;
receiving a request for the data file from a different node in the supply chain that is also a member of the blockchain ledger; and
transmitting information about the event-driven process to the different node via the blockchain ledger in response to the different node being within the number of hops upstream in the supply chain specified by the entitlement mode.

10. The method of claim 9, wherein the determining comprises determining to hide content of the data file from an upstream node within the supply chain which is not within the number of hops upstream in the supply chain specified by the entitlement mode.

11. The method of claim 10, wherein the transmitting comprises transmitting, to a downstream node within the supply chain, information about a responsibility of the downstream node with respect to the event-driven process.

12. The method of claim 9, wherein the determining comprises determining to reveal content of a second data file to an unknown upstream node within the supply chain in response to an entitlement mode of the second data file indicating a linked mode.

13. The method of claim 12, wherein the transmitting comprises transmitting, to a downstream node within the supply chain, the content of the second data file and information about a responsibility of the downstream node with respect to the event-driven process.

14. The method of claim 12, wherein the second data file expressly defines the computing node as the destination blockchain node of the second data file, but does not define any upstream or downstream nodes within the supply chain as a geographic destination of the second data file.

15. The method of claim 9, wherein the determining comprises determining to reveal a second data file to blockchain nodes outside the supply chain in response to an entitlement mode of the second data file indicating an open mode.

16. The method of claim 9, wherein the determining comprises determining to hide content of a second data file from all subsequent upstream and downstream nodes within the supply chain in response to an entitlement mode of the second data file indicating a private mode.

17. A non-transitory computer readable medium comprising instructions that when read by a processor cause the processor to perform a method comprising:
receiving a data file submitted by a blockchain node to a blockchain ledger, where the data file comprises information about an event-driven process of a supply chain and despatch advice for a shipment within the supply chain which includes an identifier of a destination node in the supply chain that is also a member of the blockchain ledger;
determining an entitlement mode of nodes within the supply chain with respect to the data file based on the dispatch advice for the shipment and one or more previously granted entitlement modes of the nodes within the supply chain, wherein the entitlement mode specifies a number of hops upstream in the supply chain that have visibility of the data file;
receiving a request for the data file from a different node in the supply chain that is also a member of the blockchain ledger; and
transmitting information about the event-driven process to the different node via the blockchain ledger in response to the different node being within the number of hops upstream in the supply chain specified by the entitlement mode.

18. The non-transitory computer-readable medium of claim 17, wherein the determining comprises determining to hide content of the data file from an upstream node within the supply chain which is not within the number of hops upstream in the supply chain specified by the entitlement mode.

19. The non-transitory computer-readable medium of claim 17, wherein the determining comprises determining to reveal content of the data file to an unknown upstream node within the supply chain in response to the retrieved entitlement mode indicating a linked mode.

20. The non-transitory computer-readable medium of claim 17, wherein the determining comprises determining to reveal content of a second data file to blockchain nodes outside the supply chain in response to an entitlement mode of the second data file indicating an open mode.

* * * * *